(12) United States Patent
Pfaller

(10) Patent No.: US 6,761,341 B2
(45) Date of Patent: Jul. 13, 2004

(54) BAR HANGER AND MOUNTING CLIP ASSEMBLY

(75) Inventor: Mark Jerome Pfaller, Memphis, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/261,276

(22) Filed: Sep. 30, 2002

(65) Prior Publication Data

US 2003/0029983 A1 Feb. 13, 2003

Related U.S. Application Data

(63) Continuation of application No. 09/565,823, filed on May 5, 2000, now Pat. No. 6,491,270.
(60) Provisional application No. 60/132,561, filed on May 5, 1999.

(51) Int. Cl.[7] .................................................. F16L 3/00
(52) U.S. Cl. ..................... 248/200.1; 248/343; 248/58; 248/906
(58) Field of Search ................................ 248/317, 343, 248/340, 328, 200.1, 906, 74.2, 57, 58, 49

(56) References Cited

U.S. PATENT DOCUMENTS

| | | | |
|---|---|---|---|
| 1,777,291 A | 10/1930 | Clayton | |
| 2,670,917 A | 3/1954 | Hoffman | |
| 3,987,992 A | 10/1976 | Foflygen | |
| 4,050,603 A | 9/1977 | Harris et al. | |
| 4,062,512 A | 12/1977 | Arnold | |
| 5,236,159 A | * 8/1993 | Avnery et al. | ............. 248/74.2 |
| 5,303,894 A | 4/1994 | Deschamps et al. | |
| 5,484,076 A | 1/1996 | Petrushka | |
| 5,606,147 A | 2/1997 | Deschamps et al. | |
| 5,619,263 A | 4/1997 | Laughlin et al. | |
| 6,119,784 A | 9/2000 | MacDonald | |

* cited by examiner

Primary Examiner—Leslie A. Braun
Assistant Examiner—Ingrid Weinhold
(74) Attorney, Agent, or Firm—Hoffmann & Baron, LLP

(57) ABSTRACT

A bar hanger and mounting clip assembly for securing an electrical box between two opposed Tee bar elements in a ceiling structure is provided which comprises a spanning bar which spans between the two opposed Tee bar elements; first and second clips at opposed ends of the spanning bar for attaching the spanning bar to the two opposed Tee bar elements; an electrical box; and a mounting clip for securing the electrical box to the spanning bar, the mounting clip including a tension leg for initially holding the electrical box in position on the spanning bar before the clip is securely fastened to the electrical box.

5 Claims, 3 Drawing Sheets

BAR HANGER AND MOUNTING CLIP ASSEMBLY

CROSS-REFERENCE TO RELATED APPLICATIONS

This application is a continuation of U.S. Ser. No. 09/565,823, filed May 5, 2000 now U.S. Pat. No. 6,491,270 which claims priority to U.S. Provisional Application No. 60/132,561, filed May 5 1999.

FIELD OF THE INVENTION

The present invention relates generally to the art of support clips and brackets and, more particularly, to a box hanger and mounting clip assembly for securing an electrical box between two Tee bars or the like.

BACKGROUND OF THE INVENTION

Heretofore, electrical junction boxes have been supported below grid ceilings using cumbersome support structures that are relatively difficult and costly to install. Prior methods of support involve, for example, the use of separate support members such as angle irons or unistruts which are cut to a required length at the job site. These support members are positioned on top of or above the grid ceiling at specified fixture support locations, and then they are anchored to the building superstructure by overhead load wires. Wherever an electrical feed is required, an electrical box must be installed along with the anchored support member. For this purpose, commercially available mounting rails or spanning bars that fasten to the Tee bars of the grid ceiling system are commonly used. Spanning bars are installed across the individual grids of the ceiling's Tee bar grid structure and permit the electrical box to easily be located with selected grids. Sometimes a load wire is dropped directly to the spanning bar and attached by means of a wire clip, however, without independent support the load carrying capacity of such an arrangement is limited.

Acoustical "Tee Bar" electrical box hangers have been widely employed, in the construction of ceilings, and particularly suspended or drop ceilings. One example is the CADDY® 512 or 512A box hanger. CADDY® is a registered trademark of Erico, Inc. of Solon, Ohio. The hanger comprises two clips riveted to the ends of a spanning bar which snap on the bulb end of the stem of the Tee bar. The electrical box is held to the spanning bar by a spring finger clip embracing the bar which is secured to the back of the electrical box by a threaded fastener. To mount the clip to the box, a knock-out must be removed from the box. The spanning bar is rectangular and edgewise to the load, with the spring finger clip including a bent portion extending over the spanning bar and with a tab of the clip being inserted into the knock-out thereby engaging an inside surface of the back of the electrical box. The portion of the clip which is secured to the back of the electrical box by a threaded fastener requires lining up a threaded hole in the clip with a mating hole in the electrical box. The 512A hanger includes slotted intermediate brackets between the ends of the spanning bar and Tee bar clips. The spanning bar is secured to the brackets by threaded clamp fasteners.

As one skilled in the art can see, the above 512 box hanger assembly has a number of disadvantages. From the perspective of the installer, screws and other detached pieces of a multipart assembly can be discouraging. To install the 512 clip assembly to the electrical box, each and every piece of the entire assembly, with the tab of the clip inserted into the knock-out and the threaded hole lined up with the mating hole in the electrical box, must be carefully held together by the installer while the screw is installed through the box and into the clip. This method is very cumbersome and can be dangerous. One has to realize that this work is usually done on a ladder or scaffold and lost parts or forgotten special tools can be a real time wasting problem which can induce the installer into jury rigged unsafe shortcuts. Any slip of the bar or the assembly can result in the assembly losing its location in reference to the box. Moreover, all buildings vibrate, and suspended wire or chain drop ceilings are susceptible to special harmonics. A need therefore exists for a bar hanger and mounting clip assembly, having all the flexibility and advantages of the multipart 512 clip assembly, yet does not include the cumbersome disadvantages described above.

SUMMARY OF THE INVENTION

The present invention fulfills this need by providing a load bearing bar hanger and mounting clip assembly: that eliminates the need for the installer to carefully hold together each and every piece of the entire assembly, with the tab of the clip inserted into the knockout and the threaded hole lined up with the mating hole in the electrical box, while the screw fastener is installed through the box and into the clip; that eliminates the need for separate support structures; that can satisfy most load specifications; that offers a savings in labor and materials as compared to clip assemblies heretofore used; that can be installed using commercially available spanning bars; that can be installed relatively easily by providing a tension leg for temporarily holding the assembly in position on the electrical box as hardware is installed; that provides a means to center the point of attachment for a support wire to avoid cocked mounting of connected electrical devices; that substantially covers a knock-out opening of the electrical box to promote NEC compliance of the overall assembly; that is readily adapted for use at electrical feed locations; and that has added versatility so that it can be used to accommodate a wide variety of different structural environments and load wire configurations.

These objects and advantages are accomplished through a bar hanger and mounting clip assembly comprising a clip for securing an electrical box to a spanning bar, the clip comprising a first generally horizontally disposed flat portion engageable with an outer surface of the electrical box; an inverted generally U-shaped portion, attached to the first flat portion, sufficiently sized for receiving the spanning bar; a second generally horizontally disposed flat portion, attached to the inverted U-shaped portion, specifically configured to be received through a box knock-out opening formed in a wall of the electrical box, the second flat portion engaging an inner surface of the wall of the electrical box; and an initial holding means in the form of a tension leg for initially holding the clip in position on the electrical box before the clip is securely fastened to the electrical box. In this particular embodiment of the present invention, the tension leg comprises a first portion extending generally upwardly from the second flat portion of the clip; a second portion extending laterally outwardly and downwardly from the first portion of the tension leg; and a third portion extending generally upwardly from a lower edge of the second portion of the tension leg. The first, second and third portions of the tension leg and the second flat portion of the clip cooperate to form a channel means for receiving a peripheral edge of the knock-out opening in the wall of the electrical box. The distance of separation between the lower edge of the second portion of the tension leg and the second flat portion of the clip is preferably less than the thickness of the wall of the electrical box so that the lower edge resiliently engages the wall of the electrical box when the wall is received therein. The clip may further comprise a load wire attachment means for receiving and engaging one or more load wires. The load wire attachment means preferably comprises a generally upwardly extending wire attachment arm and at least one wire attachment hole formed in the arm for receiving one or more load wires. The wire attachment arm preferably extends generally upwardly from the inverted U-shaped portion of the clip. The clip substantially covers the knock-out opening in the electrical box once installed.

In another embodiment of the present invention, a bar hanger and mounting clip assembly for securing an electrical box between two opposed Tee bar elements in a ceiling structure is provided which comprises a spanning bar which spans between the two opposed Tee bar elements; first and second clips at opposed ends of the spanning bar for attaching the spanning bar to the two opposed Tee bar elements; an electrical box; and a mounting clip for securing the electrical box to the spanning bar, the mounting clip including initial holding means for initially holding the electrical box in position on the spanning bar before the clip is securely fastened to the electrical box. The mounting clip preferably comprises a first generally horizontally disposed flat portion engageable with an outer surface of the electrical box; an inverted generally U-shaped portion, attached to the first flat portion, sufficiently sized for receiving the spanning bar; and a second generally horizontally disposed flat portion, attached to the inverted U-shaped portion, specifically configured to be received through a box knock-out opening formed in a wall of the electrical box, the second flat portion engaging an inner surface of the wall of said electrical box. The initial holding means preferably comprises a tension leg which includes a first portion extending generally upwardly from the second flat portion of the mounting clip; a second portion extending laterally outwardly and downwardly from the first portion of the tension leg; and a third portion extending generally upwardly from a lower edge of the second portion of said tension leg. The first, second and third portions of the tension leg and the second flat portion of the mounting clip cooperate to form a channel means for receiving a peripheral edge of the knock-out opening in the wall of said electrical box. The distance of separation between the lower edge of the second portion of the tension leg and the second flat portion of the mounting clip is less than the thickness of the wall of the electrical box so that the lower edge resiliently engages the wall of the electrical box when the wall is received therein. The clip may further comprise a load wire attachment means for receiving and engaging one or more load wires which preferably comprises a generally upwardly extending wire attachment arm and at least one wire attachment hole formed in the arm for receiving the one or more load wires. The wire attachment arm preferably extends generally upwardly from the inverted U-shaped portion of the clip. The clip substantially covers the knock-out opening in the electrical box once installed.

Other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to a specific preferred embodiment(s) thereof which is/are illustrated in the appended drawings. Note particularly that the appended drawings are not necessarily drawn to scale. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION

The present invention may be used with a grid ceiling system suspended below a structural ceiling. A grid ceiling typically has a Tee bar grid which hangs from the room's structural ceiling by drop wires and which supports ceiling tiles, typically acoustical tiles, at a desired height from the floor. The present invention preferably makes use of spanning bars conventionally used to install electrical boxes or other objects in the grid ceiling.

Figure 1:
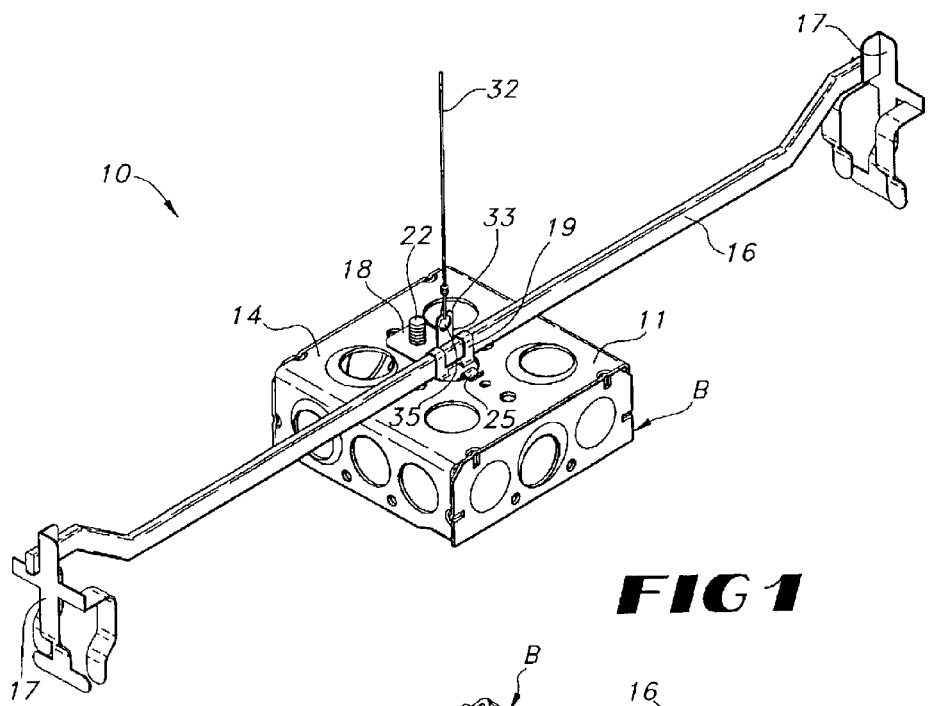
FIG. 1 is a top perspective view of a bar hanger and mounting clip assembly in accordance with the present invention installed at an electrical feed location on a spanning bar with an electrical box attached thereto.
Figure 2:
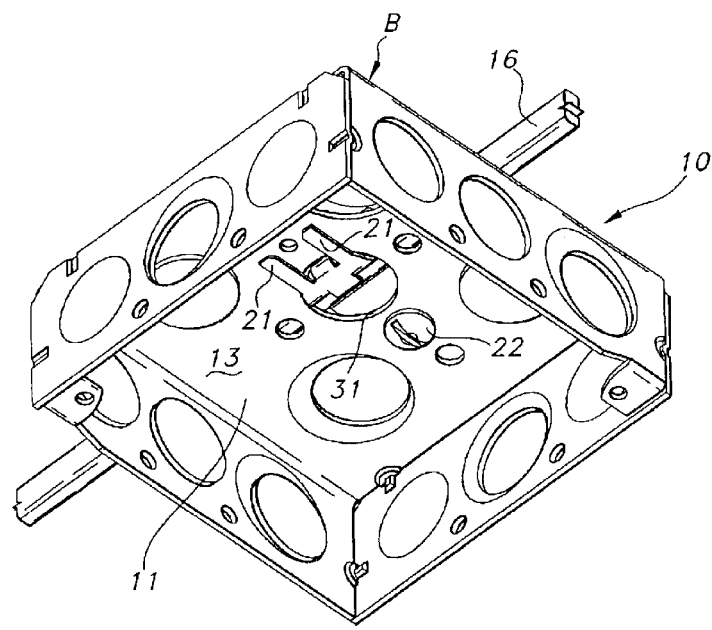
FIG. 2 is a bottom perspective view of the bar hanger and mounting clip assembly of FIG. 1.
Figure 4:
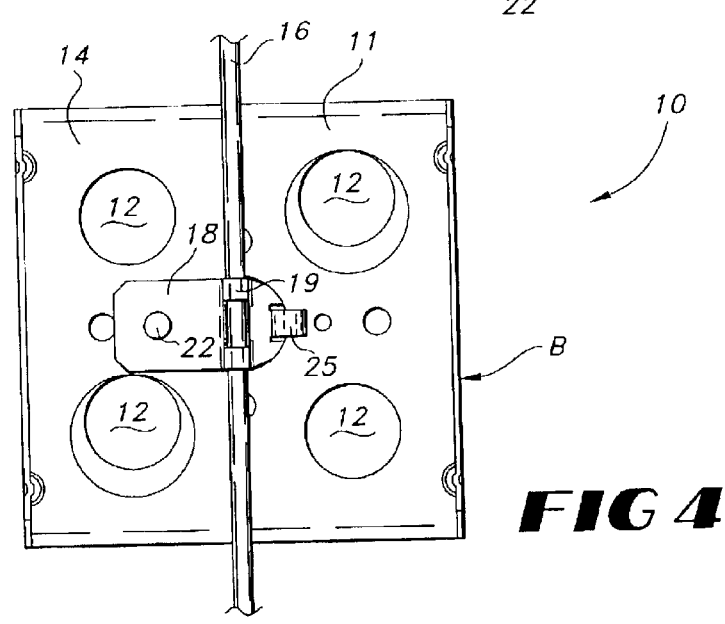
FIG. 4 is a top plan view of the bar hanger and mounting clip assembly of FIG. 1.
Figure 5:
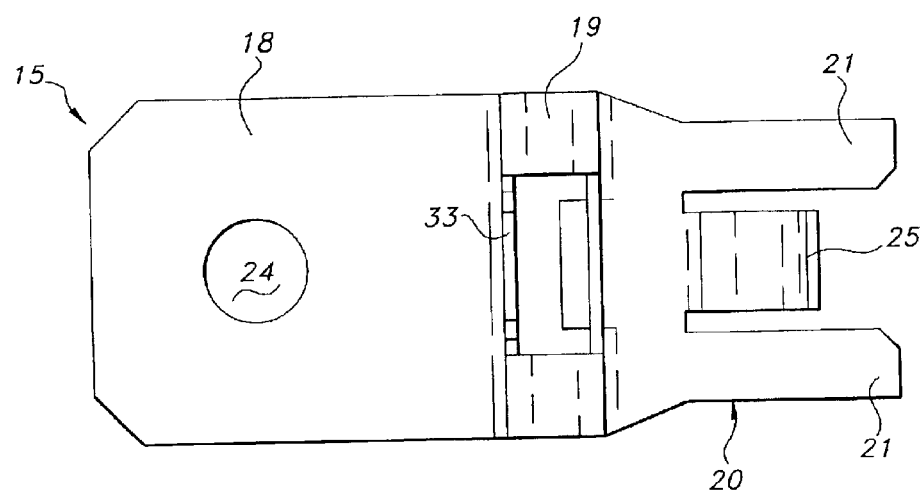
FIG. 5 is a top plan view of the mounting clip shown in FIG. 1.

Referring now to the drawings, a representative bar hanger and mounting clip assembly for securing an object such as an electrical box B between two Tee bars (not shown) or the like, embodying various features of the present invention, is generally indicated throughout the figures by reference character 10. Electrical box B is of a conventional type, and includes a generally rectangular peripheral side wall having an open front end; a rear end that is closed by a rear wall 11; and one or more knock-outs 12. Rear wall 11 includes inner and outer surfaces 13, 14. FIGS. 1, 2 and 4 show a mounting clip 15 installed on a spanning bar 16 which spans two opposed Tee bar elements (not shown) of a grid ceiling system. The spanning bar 16, which is typically of generally rectangular cross-section, may be attached to the grid's Tee bars by means of clips 17, which, together with the spanning bar, are standard, commercially available products. Clip assembly 10 holds the electrical box B to provide an electrical feed location in the grid ceiling system. Two degrees of adjustment are provided for positioning the clip assembly 10 within the ceiling grid. One degree of adjustment is provided by sliding the spanning bar 16 along the Tee bar elements and another degree of adjustment is provided by sliding the clip assembly 10 along the spanning bar 16 itself.

Figure 6:
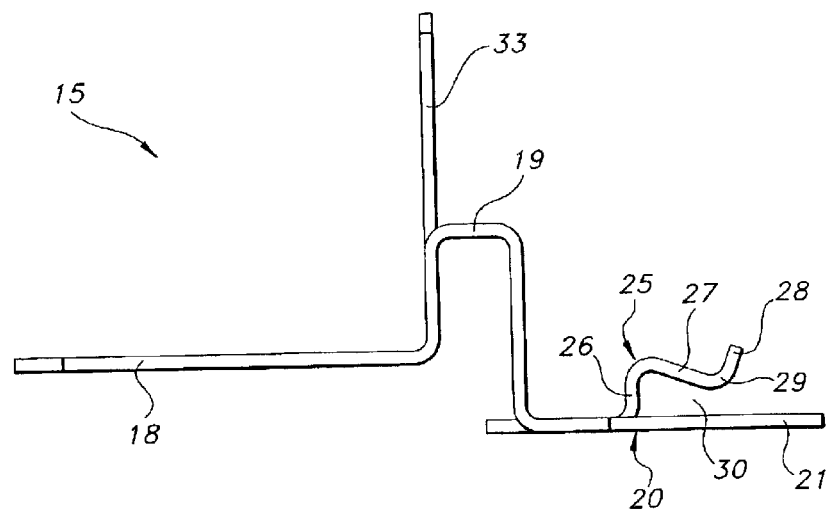
FIG. 6 is a side elevational view of the mounting clip shown in FIG. 1.

For economical manufacture, clip 15 is stamped from a flat sheet metal blank, preferably heat-treated and springtempered steel, and is bent and integrally formed in accordance with a main bending profile, as best shown in FIG. 6. As viewed in FIG. 6 from left to right, clip 15 includes a first generally horizontally disposed flat portion 18 in a first plane engageable with the outer surface 14 of the electrical box B; an inverted generally U-shaped portion 19 sufficiently sized for receiving the spanning bar 16; and a second generally horizontally disposed flat portion 20 specifically configured to be received through a box knock out 12 for engaging the inner surface 13 of the electrical box B, second flat portion 20 lying in a second plane substantially parallel to and offset from the first plane defined by first portion 18. The second flat portion 20, however, may include a pair of substantially parallel tabs 21.

In a preferred embodiment, as best viewed in FIG. 6, clip 15 includes a means for preliminarily or initially holding the clip 15 in position on the electrical box B as hardware is installed before the clip 15 is securely fastened to the box B. The initial holding means preferably comprises a tension leg 25 which, as viewed in FIG. 6, includes a first portion 26 extending generally upwardly from the second flat portion 20 of clip 15; a second portion 27 extending laterally outwardly and downwardly from the first portion 26 toward the second flat portion 20; and a third portion 28 extending generally upwardly from a lower edge 29 of the second portion 27. The portions 26, 27, 28 of tension leg 25 and the second flat portion 20 of clip 15 cooperate to form a channel means 30 which is adapted to receive a peripheral edge 31 of a knock-out 12 in the wall 11 of the electrical box B (FIGS. 1, 2 and 4). The distance of separation between the lower edge 29 of the second portion 27 of tension leg 25 and the second flat portion 20 of clip 15 is preferably less than the thickness of the peripheral edge 31 of knock-out 12 in rear wall II of box B so that the lower edge 29 resiliently engages and firmly grips the wall 11 of the box B when it is received therein thereby initially securing the box B in a fixed position relative to the clip 15. As one skilled in the art will appreciate, this eliminates the need for the installer to carefully hold together by hand each and every piece of the entire assembly while the box B is securely fastened to the clip and while hardware is installed in or on the box. Moreover, one will also appreciate, as best viewed in FIG. 4, that the clip 15 once installed substantially covers the knock-out opening 12 of the electrical box B which promotes NEC compliance of the overall assembly with respect to openings created when a knock-out is removed. Furthermore, a skilled artisan will also appreciate that there may be more than one tension leg 25 and that the tension leg 25 may be formed at other locations on the clip 15 so that, for example, the leg 25 initially engages the spanning bar 16 thereby providing substantially the same benefit.

The clip 15 may further include a load wire attachment means to receive and engage one or more load wires 32 which are anchored to overhead structural elements of the building. The load wire attachment means preferably includes a generally upwardly extending wire attachment arm 33, as best seen in FIG. 6, extending upwardly from the inverted U-shaped portion 19 of clip 15. At least one wire attachment hole 34 in formed in arm 33 to receive the load wire(s) 32. By having the wire attachment arm 33 extend upwardly from the inverted U-shaped portion 19, one skilled in the art can see that the point of attachment for the load wire(s) 32 is generally centered in reference to the box B and the spanning bar 16. This preferred configuration assists in maintaining the attached device(s) generally square to the ceiling because the load is applied at generally the center of the electrical box B and the spanning bar 16. This is definitely an advantage over the 512 prior art assembly which has the attachment point of the load wire off center which tends to cause twisting of the box under the load of the device mounted to the box. Accordingly, the preferred wire attachment means of the present invention provides a means to center the point of attachment for the load wire 32 to avoid cocked mounting of connected electrical devices.

Figure 3:
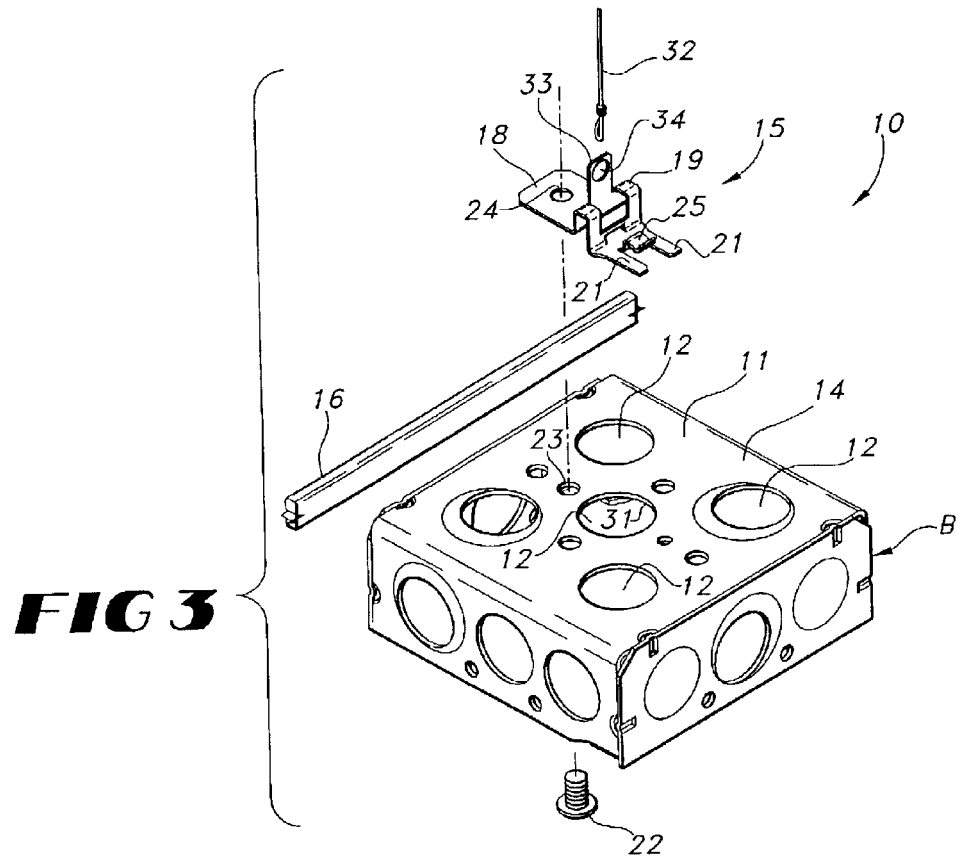
FIG. 3 is an exploded top perspective view of the bar hanger and mounting clip assembly of FIG. 1.

It should be understood that the load wire configuration illustrated in FIGS. 1 and 3 is illustrative only. The actual load wire scheme used for a particular installation will be determined by local various requirements such as building codes, the structural configuration of the installation, and the presence or absence of obstructions, such as heating/cooling ducts in the vicinity of the support locations. For example, two or more load wires, which may be splayed relative one another, can be attached to the wire attachment hole 34 to add lateral support which may be required by code.

As mentioned above, the electrical box B is held to the spanning bar 16 by clip 15 which embraces the bar 16. To securely fasten the clip 15 to the box B, the clip 15 includes inverted U-shaped portion 19 extending over the spanning bar 16 and a pair of tabs 21 which are inserted into a knock-out opening 12 thereby engaging an inside surface 13 of the rear wall 11 of the electrical box B. The first flat portion 18 of clip 15 is securely fastened or attached to the outer surface 14 of the electrical box B by a threaded fastener such as a screw 22. Screw 22 is received through the open end of box B, through a mating hole 23 in the rear wall of the box B, whereupon it threadingly engages a threaded hole 24 in the first flat portion 18. This requires lining up threaded hole 24 in the clip 15 with the mating hole 23 in the electrical box B. As indicated above, this task is made much easier by utilization of the initial holding means 25.

In a permissively variable sequence, installation of the clip assembly 10 for an electrical feed location includes the following steps. First, a knock-out 12 must be removed from the box B. Next, locate the spanning bar 16 within the grid ceiling system near the feed location in a conventional manner. The clip 15 is then placed over the spanning bar 16 such that the spanning bar 16 is received and engaged in the inverted U-shaped portion 19 of clip 15. Before the electrical box B is securely fastened to the clip 15, the pair of tabs 21 are inserted into the knock-out opening 12 thereby engaging the inside surface 13 of the rear wall 11 of the electrical box B. At generally the same time, channel means 30 receives the peripheral edge 31 of knock-out 12 in the wall 11 of the electrical box B wherein the lower edge 29 of tension leg 25 resiliently engages and firmly grips the wall 11 of the box B thereby initially securing the box B in a fixed position relative to the clip 15. Still, before the electrical box B is securely fastened to the clip 15, the clip and electrical box B can be moved in either direction along the spanning bar 16 to locate, along with further adjustments of the spanning bar 16 on the Tee bar elements, the electrical box B in the desired position. Next, the clip 15 is securely fastened to the electrical box B as described above. Once the electrical box B is securely fastened to the clip 15, the load wire(s) 32 are installed and attached to the clip 15 in whatever configuration is required. The electrical box B is then wired in a conventional manner and the electrical devices are installed.

Although a preferred embodiment(s) of the present invention has been described above by way of example, it will be understood by those skilled in the field that modifications may be made to the disclosed embodiment(s).

What is claimed is:

1. A clip for securing an electrical box to a spanning bar, said clip comprising:
   (a) a first generally horizontally disposed flat portion defining a first plane engageable with an outer surface of said electrical box;
   (b) an inverted generally U-shaped portion, attached to said first flat portion, sufficiently sized for receiving said spanning bar;
   (c) a second generally horizontally disposed flat portion, attached to said inverted U-shaped portion, specifically configured to be received through a box knock-out opening formed in a wall of said electrical box, said second flat portion defining a second plane substantially parallel to and offset from said first plane and engageable with an inner surface of said wall of said electrical box; and
   (d) initial holding means in the form of a tension leg including first portion extending generally upwardly from said second flat portion of said clip; a second portion extending laterally outwardly and downwardly from said first portion of said tension leg; and a third portion extending generally upwardly from a lower edge of said second portion of said tension leg; said first, second and third portions of said tension leg and said second flat portion of said clip cooperate to form a channel means for receiving a peripheral edge of said knock-out opening in said wall of said electrical box and for initially holding said clip in position on said electrical box before said clip is securely fastened to said electrical box.

2. A clip as defined in claim 1, wherein said tension leg resiliently engages said wall of said electrical box when said wall is received therein.

3. A clip for securing an electrical box to a spanning bar, said clip comprising:
   (a) a first generally horizontally disposed flat portion defining a first plane engageable with an outer surface of said electrical box;
   (b) an inverted generally U-shaped portion, attached to said first flat portion, sufficiently sized for receiving said spanning bar;
   (c) a second generally horizontally disposed flat portion, attached to said inverted U-shaped portion, specifically configured to be received through a box knock-out opening formed in a wall of said electrical box, said second flat portion defining a second plane substantially parallel to and offset from said first plane and engageable with an inner surface of said wall of said electrical box;
   (d) initial holding means in the form of a tension leg for initially holding said clip in position on said electrical box before said clip is securely fastened to said electrical box; and load wire attachment means comprising a generally upwardly extending wire attachment arm and at least one wire attachment hole formed in said arm for receiving one or more load wires.

4. A clip as defined in claim 3, wherein said wire attachment arm extends generally upwardly from said inverted U-shaped portion of said clip.

5. A clip as defined in claim 1, wherein said clip substantially covers said knock-out opening in said electrical box once installed.

* * * * *